US011314869B2

United States Patent
Kimura

(10) Patent No.: US 11,314,869 B2
(45) Date of Patent: Apr. 26, 2022

(54) PROCESSOR, CONTROL DEVICE, AND COMPUTER READABLE RECORDING MEDIUM

(71) Applicant: Sony Olympus Medical Solutions Inc., Tokyo (JP)

(72) Inventor: Masashige Kimura, Tokyo (JP)

(73) Assignee: SONY OLYMPUS MEDICAL SOLUTIONS INC., Tokyo (JP)

(*) Notice: Subject to any disclaimer, the term of this patent is extended or adjusted under 35 U.S.C. 154(b) by 209 days.

(21) Appl. No.: 16/705,297

(22) Filed: Dec. 6, 2019

(65) Prior Publication Data

US 2020/0265142 A1 Aug. 20, 2020

(30) Foreign Application Priority Data

Feb. 20, 2019 (JP) .............................. JP2019-028524

(51) Int. Cl.
| | |
|---|---|
| *G06F 21/57* | (2013.01) |
| *H04L 9/32* | (2006.01) |
| *G06F 21/60* | (2013.01) |
| *H04L 9/12* | (2006.01) |

(52) U.S. Cl.
CPC .......... *G06F 21/575* (2013.01); *G06F 21/602* (2013.01); *H04L 9/3234* (2013.01); *G06F 2221/034* (2013.01)

(58) Field of Classification Search
CPC ................. G06F 21/575; G06F 21/602; G06F 2221/034; H04L 9/3234; H04L 9/32; H04L 9/0894; H04L 9/12
USPC .................................................. 713/1, 2, 100
See application file for complete search history.

(56) References Cited

U.S. PATENT DOCUMENTS

| | | | |
|---|---|---|---|
| 2005/0182952 A1* | 8/2005 | Shinozaki ............. | G06F 21/575 713/189 |
| 2010/0020967 A1* | 1/2010 | Kailash .................. | H04L 63/08 380/45 |
| 2019/0098737 A1* | 3/2019 | Nagesh .................. | A61B 6/548 |

FOREIGN PATENT DOCUMENTS

JP 2014-235326 A 12/2014

* cited by examiner

*Primary Examiner* — Michael J Brown
(74) *Attorney, Agent, or Firm* — Xsensus LLP

(57) ABSTRACT

A processor including hardware and performing control in accordance with an input signal is configured to: read, after the processor is booted, firmware information including an encrypted authentication file and an execution program to be executed by the processor; decrypt the encrypted authentication file with reference to the read encrypted authentication file and key information for decrypting the encrypted authentication file; execute the execution program in the processor when the encrypted authentication file is decrypted; and stop the execution of the execution program in the processor when the decryption of the encrypted authentication file fails.

12 Claims, 4 Drawing Sheets

PROCESSOR, CONTROL DEVICE, AND COMPUTER READABLE RECORDING MEDIUM

This application claims priority from Japanese Application No. 2019-028524, filed on Feb. 20, 2019, the contents of which are incorporated by reference herein in its entirety.

BACKGROUND

The present disclosure relates to a processor, a control device, and a computer readable recording medium.

An observation system for observing the inside of the body of a subject, such as a person or a machine structure, has been known in the medical field or the industrial field. The observation system includes an endoscope to be inserted into a subject to image the inside of the subject and output an image signal, a control device (processor) that processes the image signal and generates a video signal for display, and a display device for displaying an image based on the video signal.

Meanwhile, to prevent falsification of the endoscope and the display device connected to the control device, a technique for prohibiting startup of unverified software is known (e.g., see JP 2014-235326 A). Such a technique is generally called secure boot by which rewriting of an operating startup program to be operated is detected and non-falsification of an operating system (OS) is confirmed before startup.

In JP 2014-235326 A, the secure boot is performed by providing a security module.

FIG. 4 is a block diagram illustrating a known configuration for performing the secure boot. In the related art, a device that performs secure boot includes a main central processing unit (CPU) 101, a security module 102, a double-data-rate synchronous dynamic random access memory (DDR-SDRAM) 103, a program information storage unit 104, and a key information storage unit 105. The main CPU 101, the security module 102, the DDR-SDRAM 103, the program information storage unit 104, and the key information storage unit 105 are electrically connected by a bus.

FIG. 5 is a flowchart illustrating secure boot processing. In the secure boot processing, the security module 102 first reads firmware from the program information storage unit 104 (Step S201). It is assumed that the firmware to be read out here is an encrypted authentication file.

The security module 102 decrypts the encrypted authentication file with reference to the read firmware and an authentication key stored in the key information storage unit 105, and verifies the validity of the firmware in accordance with the success or failure of the decryption. As a result of the verification, if the encrypted authentication file is valid, that is, if the encrypted authentication file is decrypted (Step S202: Yes), the security module 102 proceeds to Step S203. In contrast, if the encrypted authentication file is not valid (Step S202: No), the security module 102 proceeds to Step S206.

In Step S203, the read firmware is expanded in the DDR-SDRAM 103.

Subsequently, the main CPU 101 is activated, and the OS is initialized using the read firmware (Step S204). Then, the main CPU 101 initializes various applications (Step S205). In this way, the device is booted by software with ensured validity.

On the other hand, in Step S206, the security module 102 determines no validity of the firmware and stops the boot processing of the device.

If the secure boot is applied to the above-described observation system, it is possible to prevent falsification of the endoscope and the display device by preventing activation of software whose validity is not ensured.

SUMMARY

JP 2014-235326 A requires a security module as hardware dedicated to secure boot. Further, in the secure boot, all software (firmware) is encoded, so that it takes time to start up the OS.

According to one aspect of the present disclosure, there is provided a processor including hardware and performing control in accordance with an input signal, the processor being configured to: read, after the processor is booted, firmware information including an encrypted authentication file and an execution program to be executed by the processor; decrypt the encrypted authentication file with reference to the read encrypted authentication file and key information for decrypting the encrypted authentication file; execute the execution program in the processor when the encrypted authentication file is decrypted; and stop the execution of the execution program in the processor when the decryption of the encrypted authentication file fails.

DETAILED DESCRIPTION

Figure 1:
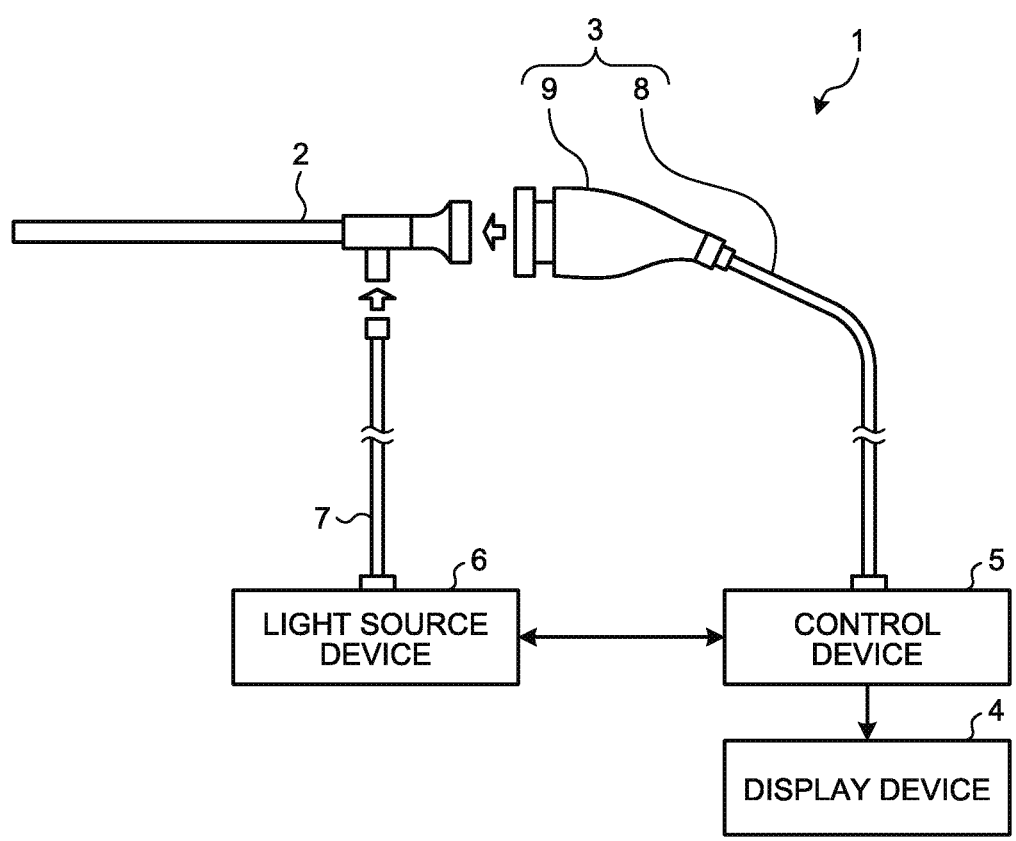
FIG. 1 is a diagram illustrating a schematic configuration of an endoscope apparatus according to an embodiment.

Hereinafter, modes for carrying out the present invention (hereinafter referred to as "embodiment") will be described. An embodiment describes a medical endoscope apparatus that captures and displays an image in the body of a subject such as a patient as an example of a system including a control device having a processor. Moreover, the disclosure is not limited by the present embodiment. Further, in the description of the drawings, the same portions are described with the same reference numerals.

Embodiment

Figure 2:
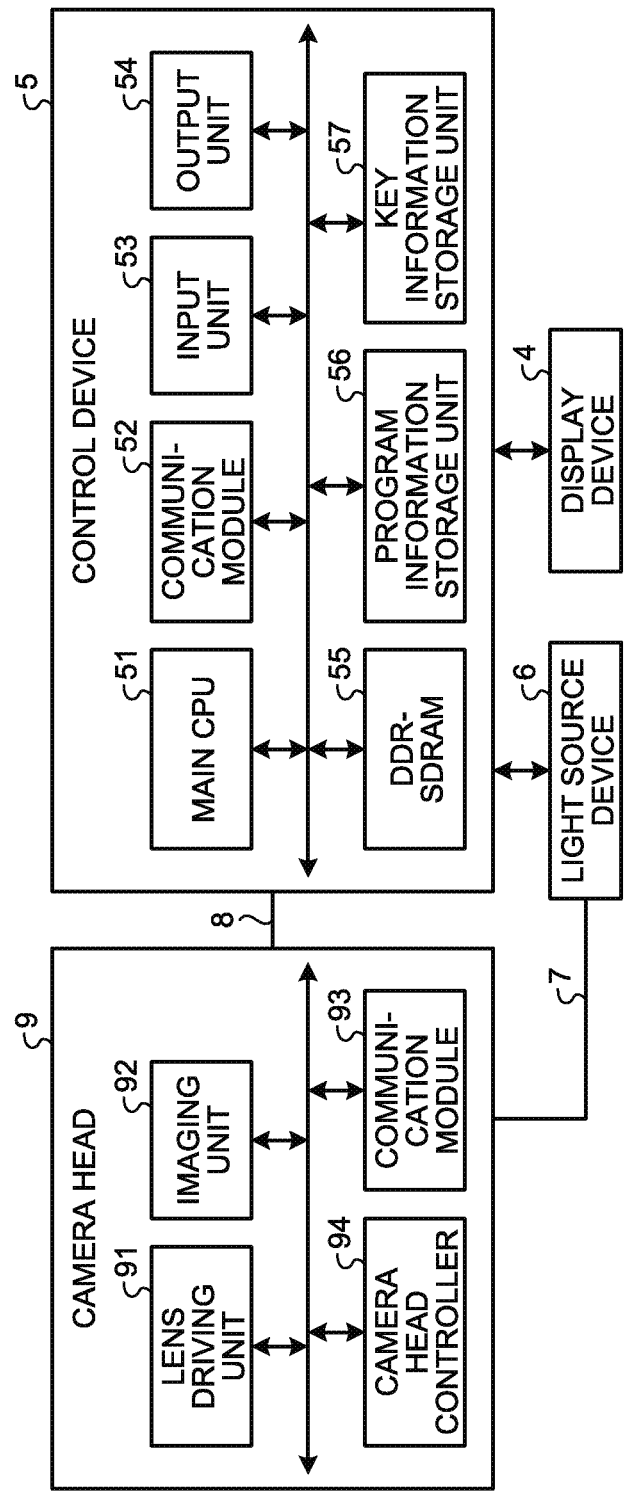
FIG. 2 is a block diagram illustrating configurations of a camera head and a control device illustrated in FIG. 1.

FIG. 1 is a diagram illustrating a schematic configuration of an endoscope apparatus 1 according to an embodiment. FIG. 2 is a block diagram illustrating configurations of a camera head 9 and a control device 5. The endoscope apparatus 1 is an apparatus used in the medical field to observe the inside (in vivo) of a subject to be observed such as a person. As illustrated in FIG. 1, the endoscope apparatus 1 includes an endoscope 2, an imaging device 3, a display device 4, a control device 5, and a light source device 6. The imaging device 3 and the control device 5 form a medical observation system.

The light source device 6 is connected to one end of a light guide 7. Provided at the one end of the light guide 7 are a light source unit that supplies illumination light such as white light for illuminating the inside of the living body or near-infrared light used for special observation, and a light source controller that controls emission of illumination light from the light source unit (not illustrated). As illustrated in FIG. 1, the light source device 6 and the control device 5 may be configured separately and communicate with each other, or may be integrated.

The light guide 7 has one end detachably connected to the light source device 6 and the other end detachably connected to the endoscope 2. The light guide 7 transmits the light supplied from the light source device 6 from one end to the other end and supplies the light to the endoscope 2.

The imaging device 3 captures a subject image from the endoscope 2 and outputs the imaging result. As illustrated in FIG. 1, the imaging device 3 includes a transmission cable 8 that is a signal transmission unit, and a camera head 9. In the first embodiment, the transmission cable 8 and the camera head 9 constitute a medical imaging device.

The endoscope 2 is rigid and elongated, and is inserted into a living body. Inside the endoscope 2, an observation optical system configured to collect a subject image is provided using one or a plurality of lenses. The endoscope 2 emits light supplied via the light guide 7 from the end to illuminate the inside of the living body. Then, the light (subject image) emitted into the living body is collected by the observation optical system in the endoscope 2.

The camera head 9 is detachably connected to the proximal end of the endoscope 2. Then, under the control of the control device 5, the camera head 9 captures the subject image collected by the endoscope 2, and outputs an imaging signal based on the imaging. The detailed configuration of the camera head 9 will be described later. The endoscope 2 and the camera head 9 may be configured to be detachable as illustrated in FIG. 1, or may be configured to be integrated.

One end of the transmission cable 8 is detachably connected to the control device 5 via a connector, and the other end is detachably connected to the camera head 9 via a connector. Specifically, the transmission cable 8 is a cable in which a plurality of electrical wirings (not illustrated) are disposed inside the outer jacket which is the outermost layer. The plurality of electrical wirings are used to transmit an imaging signal output from the camera head 9 to the control device 5, while transmitting a control signal, a synchronization signal, a clock, and power output from the control device 5 to the camera head 9.

The display device 4 displays an image generated by the control device 5 under the control of the control device 5. The display device 4 preferably has a display unit having a size of 55 inches or more in order to easily obtain an immersive feeling during observation, but is not limited thereto.

The control device 5 processes the imaging signal input from the camera head 9 via the transmission cable 8, outputs the image signal to the display device 4, while comprehensively controlling the operation of the camera head 9 and the display device 4. The detailed configuration of the control device 5 will be described later.

Next, configurations of the imaging device 3 and the control device 5 will be described. In FIG. 2, connectors to detachably connect the endoscope 2 to the light source device 6 and the camera head 9 to the transmission cable 8 are not illustrated.

Hereinafter, the configurations of the control device 5 and the camera head 9 are described sequentially. In the following description, major components are mainly described in the configuration of the control device 5. As illustrated in FIG. 2, the control device 5 includes a main CPU 51, a communication module 52, an input unit 53, an output unit 54, and a DDR-SDRAM 55, a program information storage unit 56, and a key information storage unit 57. The main CPU 51, the communication module 52, the input unit 53, the output unit 54, the DDR-SDRAM 55, the program information storage unit 56, and the key information storage unit 57 are electrically connected by a bus. The control device 5 is dedicated to an embedded CPU configured by special hardware dedicated to a medical device (which is herein the endoscope 2). Note that the control device 5 may include a power source unit or the like (not illustrated) that generates a power supply voltage for driving the control device 5 and the camera head 9 and supplies the power supply voltage to individual portions of the control device 5 and to the camera head 9 via the transmission cable 8.

The main CPU 51 is a processor that performs drive control of individual components including the control device 5 and the camera head 9, and input/output control of information with respect for the individual components. The main CPU 51 performs secure boot using the firmware expanded in the DDR-SDRAM 55 and, when the validity of the firmware is ensured, boots the control device 5 using this firmware.

In addition, the main CPU 51 generates a control signal with reference to communication information data (e.g., communication format information), and transmits the generated control signal to the imaging device 3 via the communication module 52. The main CPU 51 outputs a control signal to the camera head 9 via the transmission cable 8.

The communication module 52 and the main CPU 51 described above are realized using a general-purpose processor such as a CPU. Further, a dedicated processor such as an application specific integrated circuit (ASIC) for various arithmetic circuits executing specific functions, or a field programmable gate array (FPGA: not illustrated) which is a kind of programmable integrated circuits may be used. When the FPGA is used, a memory for storing configuration data may be provided, and the FPGA, which is a programmable integrated circuit, may be configured based on the configuration data read from the memory.

Further, the main CPU 51 generates a digitized imaging signal by performing signal processing such as noise removal and A/D conversion, as necessary, on the imaging signal output from the camera head 9, and generates a display image signal displayed by the display device 4. The main CPU 51 performs predetermined signal processing on the imaging signal to generate a display image signal including the image of the subject. Here, the main CPU 51 performs known image processing such as detection processing, interpolation processing, color correction processing, color enhancement processing, contour enhancement processing, and the like. The main CPU 51 outputs the generated image signal to the display device 4.

Further, the main CPU 51 generates a synchronization signal and a clock for the imaging device 3 and the control device 5. A synchronization signal (e.g., a synchronization signal for giving an instruction on imaging timing of the camera head 9) and a clock (e.g., a clock for serial communication) to the imaging device 3 are sent to the imaging device 3 through a line (not illustrated), and the imaging device 3 is driven based on such a synchronization signal or clock.

The communication module 52 outputs a signal from the control device 5 including a later-described control signal transmitted from the main CPU 51 to the imaging device 3. In addition, a signal from the imaging device 3 is output to each unit in the control device 5. That is, the communication module 52 is a relay device that collectively outputs the signals from the individual components of the control device 5 to the imaging device 3 by, for example, parallel-to-serial conversion, while sorting the signals input from the imaging device 3 by, for example, serial-to-parallel conversion to output the sorted signals to the individual components of the control device 5.

The input unit 53 is implemented using a user interface such as a keyboard, a mouse, and a touch panel, and accepts input of various types of information.

The output unit 54 is implemented using a speaker, a printer, a display, or the like, and outputs various types of information. The output unit 54 outputs alarm sound and alarm light and displays an image under the control of the main CPU 51. For example, when it is determined from the verification result by the main CPU 51 that the firmware is not valid, the output unit 54 outputs alarm sound and alarm light under the control of the main CPU 51.

In the DDR-SDRAM 55, the firmware read by the main CPU 51 is expanded. The DDR-SDRAM 55 needs to be configured using a volatile memory, and may be configured using a random access memory (RAM) such as the synchronous dynamic random access memory (SDRAM).

The program information storage unit 56 is configured using a nonvolatile memory, and stores firmware including various programs (e.g., a startup program, a program for controlling individual devices connected to the control device 5, and the like) executed by the main CPU 51. Examples of the nonvolatile memory include a semiconductor memory, such as a flash memory (e.g., an embedded MultiMediaCard (eMMC)), a nonvolatile read only memory (ROM), or the like. In the present embodiment, the firmware stored in the program information storage unit 56 includes therein an encrypted authentication file. Specifically, it is executed at the head of a plurality of firmware processing steps stored in the program information storage unit 56. Note that the program information storage unit 56 may store communication information data (e.g., communication format information) and the like.

The key information storage unit 57 is configured using a semiconductor memory, such as a nonvolatile memory, for example, a flash memory or a non-volatile ROM, and stores information on the authentication key to be used to decrypt the encrypted authentication file among firmware stored in the program information storage unit 56.

Note that the information stored in the program information storage unit 56 and the information stored in the key information storage unit 57 may be stored in a common nonvolatile memory.

Next, main components are mainly described as a configuration of the camera head 9. As illustrated in FIG. 2, the camera head 9 includes a lens driving unit 91, an imaging unit 92, a communication module 93, and a camera head controller 94.

The lens driving unit 91 is formed of one or a plurality of lenses and a drive mechanism that moves at least one lens, and forms an image of the subject through the lens on an imaging plane of the imaging element of the imaging unit 92. At least one of the one or plurality of lenses is configured to be movable along an optical axis. In the lens driving unit 91, the drive mechanism moves the one or plurality of lenses to change an angle of view (optical zoom) or change a focal position (focus adjustment). The lens included in the lens driving unit 91 forms the observation optical system that guides observation light incident on the endoscope 2 to the imaging unit 92 together with the optical system provided in the endoscope 2.

The imaging unit 92 images the subject under the control of the camera head controller 94. The imaging unit 92 is configured using the imaging element that receives a subject image formed by the lens driving unit 91 and converts the received subject image into an electric signal. The imaging element is formed of a charge coupled device (CCD) image sensor or a complementary metal oxide semiconductor (CMOS) image sensor. When the imaging element is a CCD, a signal processing unit (not illustrated), for example, that performs signal processing (e.g., A/D conversion) on the electric signal (analog signal) from the imaging element and outputs the imaging signal is mounted on a sensor chip or the like. When the imaging element is a CMOS, the imaging element includes a signal processing unit (not illustrated), for example, that performs signal processing (e.g., A/D conversion) on the electric signal (analog signal) converted from the light to the electric signal and outputs the imaging signal. The imaging unit 92 outputs the generated electric signal to the communication module 93.

The communication module 93 outputs a signal transmitted from the control device 5 to individual components in the camera head 9 such as the camera head controller 94. Further, the communication module 93 converts information on the current state of the camera head 9 into a signal format corresponding to a predetermined transmission method, and outputs the converted signal to the control device 5 via the transmission cable 8. In other words, the communication module 93 is a relay device that sorts the signals input from the control device 5 and through the transmission cable 8 by serial-to-parallel conversion or the like, and outputs the sorted signals to individual components of the camera head 9, while collectively outputting signals to be output to the control device 5 and the transmission cable 8 from the individual components of the camera head 9 by parallel-to-serial conversion or the like.

The camera head controller 94 controls the entire operation of the camera head 9 in accordance with, for example, the drive signal input through the transmission cable 8 or the instruction signal output from the operating unit by a user by operating an operating unit such as a switch exposed externally on the outer surface of the camera head 9. Further, the camera head controller 94 outputs information on the current state of the camera head 9 to the control device 5 via the transmission cable 8.

The communication module 93 and the camera head controller 94 described above are implemented using a general-purpose processor such as the CPU having an internal memory (not illustrated) in which programs are stored, or a dedicated processor such as the ASIC for various arithmetic circuits executing specific functions. Further, the FPGA which is a kind of programmable integrated circuit may be used. If, herein, the FPGA is used, a memory for storing configuration data may be provided, and the FPGA, which is a programmable integrated circuit, may be configured with configuration data read from the memory.

Further, the camera head 9 and the transmission cable 8 may include a signal processing unit that performs signal processing on the imaging signal generated by the communication module 93 or the imaging unit 92. Further, in accordance with a reference clock generated by an oscillator (not illustrated) provided in the camera head 9, it may be possible to generate an imaging clock for driving the imaging unit 92 and a control clock for the camera head controller 94, and output these clocks to the imaging unit 92 and the camera head controller 94, respectively. Alternatively, in accordance with a synchronization signal input from the control device 5 via the transmission cable 8, it may also be possible to generate timing signals for various kinds of processing in the imaging unit 92 and the camera head controller 94, and output the timing signals to the imaging unit 92 and the camera head controller 94, respectively. Further, the camera head controller 94 may be provided on the transmission cable 8 or the control device 5 instead of the camera head 9.

Figure 3:
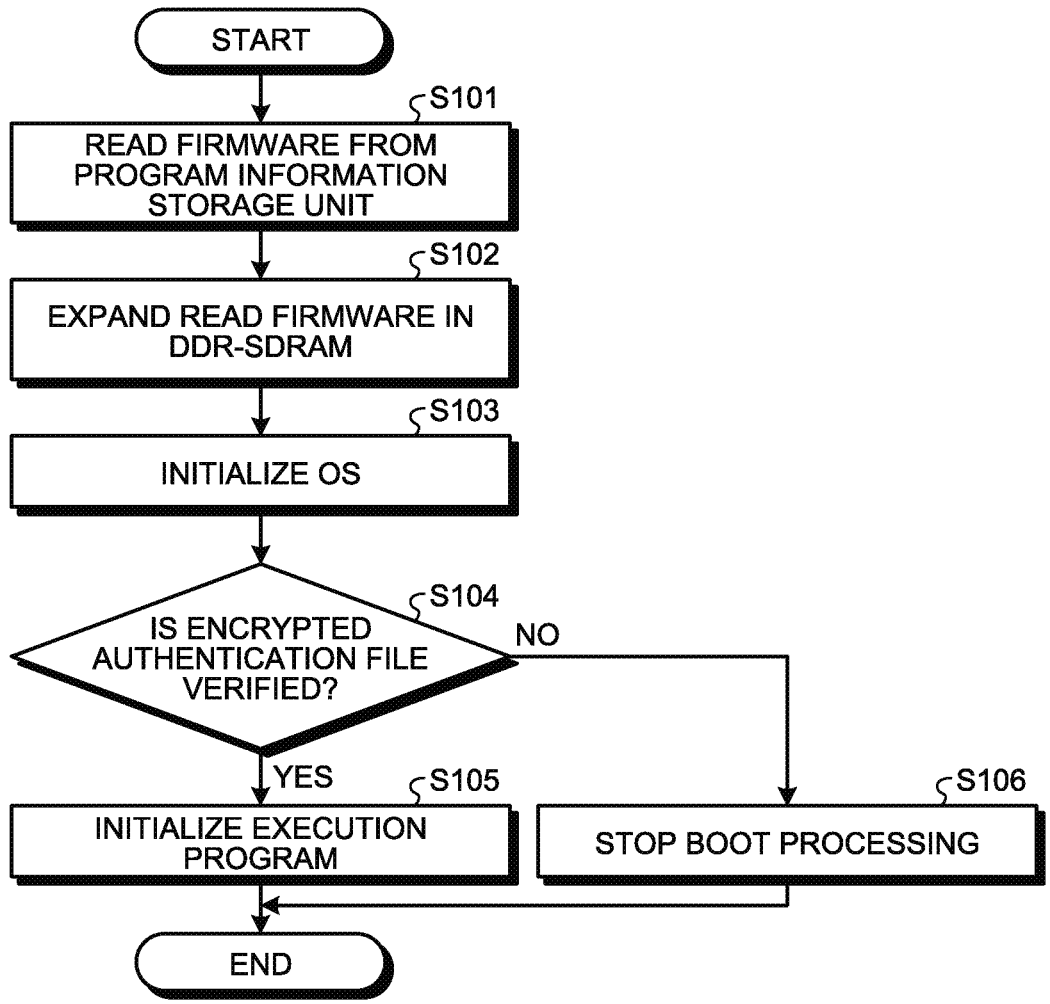
FIG. 3 is a flowchart illustrating a processing flow of activation performed by the control device according to the embodiment.
Figure 4:
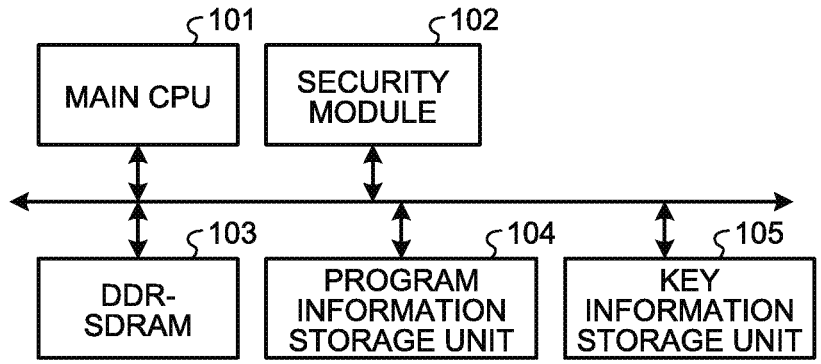
FIG. 4 is a block diagram illustrating a known configuration for performing secure boot.
Figure 5:
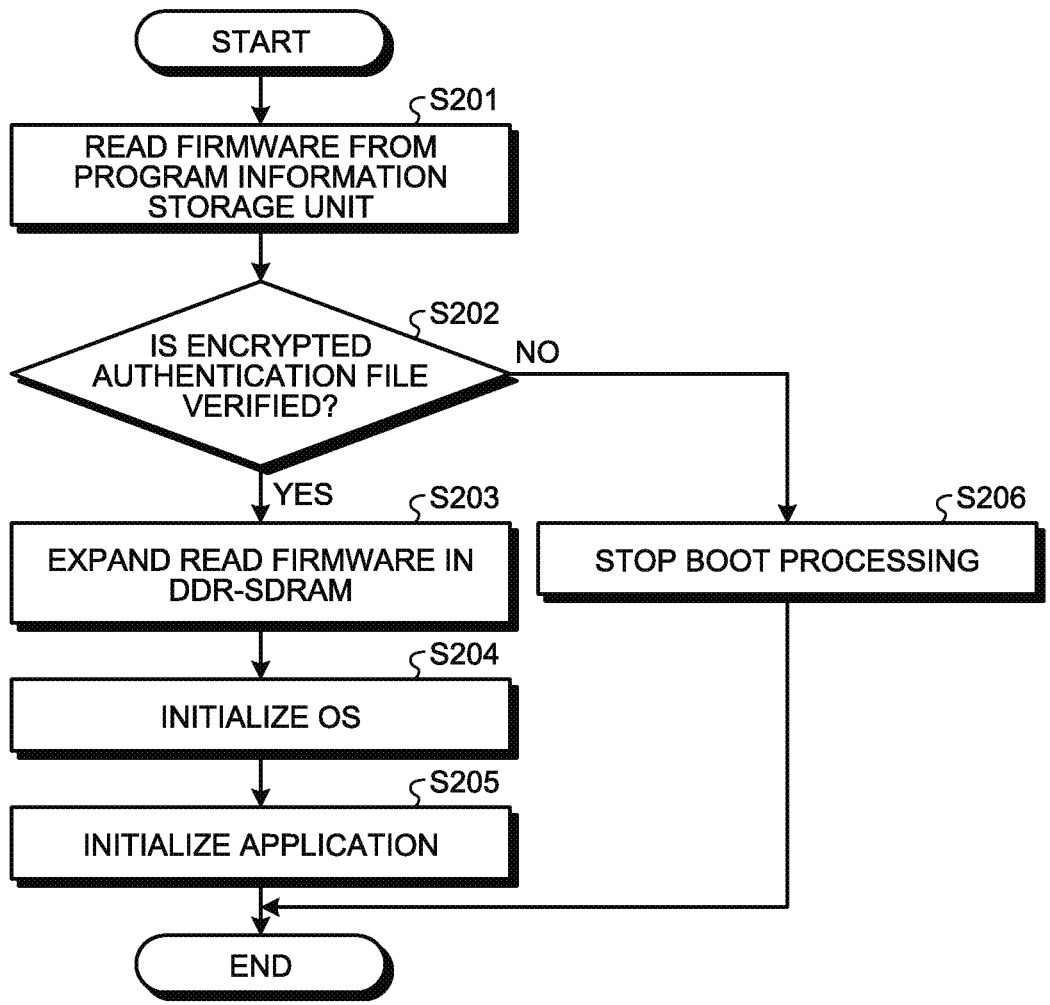
FIG. 5 is a flowchart illustrating the known secure boot processing.

Next, the secure boot processing according to the present embodiment is described with reference to FIG. 3. FIG. 3 is a flowchart illustrating processing at the time of activation performed by the control device according to the embodiment. In the secure boot processing according to the present embodiment, the main CPU 51 executes the processing in accordance with the startup program.

First, the main CPU 51 reads the firmware from the program information storage unit 56 after booting itself (Step S101). The firmware read out here includes an encrypted authentication file.

In Step S102, the main CPU 51 expands the read firmware in the DDR-SDRAM 55. Thus, booting of the main CPU 51 is completed.

After that, the main CPU 51 initializes the OS using the firmware expanded in the DDR-SDRAM 55 (Step S103).

In Step S104 following Step S103, the main CPU 51 decrypts the encrypted authentication file with reference to the encrypted authentication file put in the firmware expanded in the DDR-SDRAM 55, and an authentication key stored in the key information storage unit 57, thus verifying the validity of the firmware in accordance with the success or failure of the decryption. The main CPU 51 may also verify the firmware by comparing, for example, the number of code lines, objects, and checksum, the actual number of code lines, objects, checksum, and so on, of the program in the decrypted authentication file. The main CPU 51 branches the subsequent processing depending on the result of determining whether the firmware is valid.

If the main CPU 51 determines that the result is valid (Step S104: Yes), the main CPU 51 proceeds to Step S105. On the other hand, if the main CPU 51 determines no validity (Step S104: No), the main CPU 51 proceeds to Step S106.

In Step S105, the main CPU 51 initializes various execution programs stored in the program information storage unit 56. In this way, the control device 5 is booted by the verified software.

On the other hand, in Step S106, the main CPU 51 determines that the firmware is not verified and stops boot processing of the apparatus.

In the embodiment described above, the main CPU 51 verifies the validity of the firmware that has been converted into the encrypted authentication file and, after verification, boots the control device 5 when the firmware is verified. In the present embodiment, the main CPU 51 executes a simple secure boot processing for a portion of the firmware, so that the verification processing is completed in a short time without requiring a separate security module as in the prior art. According to the present embodiment, the necessary secure boot is performed in a simple configuration and in a short time. Further, according to the present embodiment, it is not necessary to design a security module or the like, and it is possible to reduce software development man-hours as compared with the known case.

Although the embodiment for carrying out the present disclosure has been described so far, the present disclosure should not be limited only by the embodiment described above. The above-described embodiment uses the endoscope apparatus 1 using a rigid endoscope as the endoscope 2 that is a medical device, but the present disclosure is not limited thereto, and the endoscope apparatus using a flexible endoscope may be used. Alternatively, it may be applied to a control device for a surgical microscope system having a function of enlarging and capturing a predetermined visual field area and displaying the captured image. In addition, the display device 4 that displays an image of the endoscope 2 and a treatment tool (not illustrated) that treats the living body also correspond to a medical device.

Although the above-described embodiment has described the example in which the firmware is stored in the storage unit provided in the control device 5, the firmware may be read from an external storage device (e.g., the MultiMedia-Card (MMC), an SD-standard memory card, and so on).

Further, the above-described embodiment has described the example in which the main CPU 51 initializes the OS before verifying the encrypted authentication file, but the encrypted authentication file may be verified before the OS is initialized.

Further, the secure boot according to the above-described embodiment is also applicable to a configuration that requires no OS initialization. In this case, the process of Step S103 is omitted.

Further, the above-described embodiment may be configured such that a security module is provided to execute simple secure boot or execute the known security module using the main CPU 51 is selected as necessary.

As described above, the processor, the control device, and the processor startup program are useful for performing a necessary secure boot with a simple configuration and in a short time.

According to the present disclosure, an effect of preventing falsification by performing necessary secure boot in a short time with a simple configuration may be obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A processor comprising hardware and performing control in accordance with an input signal, the processor being configured to:
   read, after the processor has booted itself, firmware information including an encrypted authentication file and an execution program to be executed by the processor;
   decrypt the encrypted authentication file with reference to the read encrypted authentication file and key information for decrypting the encrypted authentication file;
   execute the execution program in the processor when the encrypted authentication file is decrypted; and
   prevent the execution of the execution program in the processor when the decryption of the encrypted authentication file fails.

2. The processor according to claim 1, wherein
   the processor executes an application for controlling a device connected to the processor when the encrypted authentication file is decrypted, and
   the processor stops the execution of the application for controlling the device when the decryption of the encrypted authentication file fails.

3. The processor according to claim 1, wherein
the processor executes a program for starting an operating system when the encrypted authentication file is decrypted, and
the processor stops the execution of the program for starting the operating system when the decryption of the encrypted authentication file fails.

4. The processor according to claim 1, wherein
the processor is configured to control a medical device, and
the processor executes an application for controlling the medical device when the encrypted authentication file is decrypted.

5. A control device, comprising:
a processor comprising hardware and configured to perform control in accordance with an input signal;
a nonvolatile memory configured to store firmware information including an encrypted authentication file and an execution program to be executed by the processor, and key information for decrypting the encrypted authentication file; and
a volatile memory configured to store information related to startup processing executed by the processor, wherein
the processor is configured to:
   read, after the processor has booted itself, the firmware information;
   expand the firmware information in the volatile memory;
   decrypt the encrypted authentication file with reference to the expanded encrypted authentication file and the key information;
   execute the execution program in the processor when the encrypted authentication file is decrypted; and
   prevent the execution of the execution program when the decryption of the encrypted authentication file fails.

6. The control device according to claim 5, wherein
the processor executes an application for controlling a device connected to the processor when the encrypted authentication file is decrypted, and
the processor stops the execution of the application for controlling the device when the decryption of the encrypted authentication file fails.

7. The control device according to claim 5, wherein
the processor executes a program for starting an operating system when the encrypted authentication file is decrypted, and
the processor stops the execution of the program for starting the operating system when the decryption of the encrypted authentication file fails.

8. The control device according to claim 5, wherein
the processor is configured to control a medical device, and
the processor executes an application for controlling the medical device when the encrypted authentication file is decrypted.

9. A non-transitory computer readable recording medium on which an executable program for performing control in accordance with an input signal; the program instructing a processor to execute:
reading, with reference to a memory, after the processor has boated itself, firmware information including an encrypted authentication file and an execution program to be executed by the processor;
decrypting the encrypted authentication file with reference to the read encrypted authentication file and key information for decrypting the encrypted authentication file;
executing the execution program in the processor when the encrypted authentication file is decrypted; and
preventing the execution of the execution program when the decryption of the encrypted authentication file fails.

10. The transitory computer readable recording medium according to claim 9, wherein the processor further executes:
controlling a device connected to the processor when the encrypted authentication file is decrypted, and
stopping controlling the device when the decryption of the encrypted authentication file fails.

11. The transitory computer readable recording medium according to claim 9, wherein the processor further executes:
starting an operating system when the encrypted authentication file is decrypted, and
stopping starting the operating system when the decryption of the encrypted authentication file fads.

12. The transitory computer readable recording medium according to claim 9, wherein the processor further executes:
controlling a medical device when the encrypted authentication file is decrypted.

* * * * *